US008205058B2

(12) United States Patent
Martin et al.

(10) Patent No.: US 8,205,058 B2
(45) Date of Patent: Jun. 19, 2012

(54) RESOURCE MANAGEMENT FOR DATA STORAGE SERVICES

(75) Inventors: Howard Newton Martin, Vail, AZ (US); Rosa Teslier Plaza, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1399 days.

(21) Appl. No.: 11/009,833

(22) Filed: Dec. 10, 2004

(65) Prior Publication Data

US 2006/0129770 A1 Jun. 15, 2006

(51) Int. Cl.
*G06F 12/00* (2006.01)
(52) U.S. Cl. ............... 711/170; 711/117; 711/E12.016; 711/E12.103
(58) Field of Classification Search .................... 711/170
See application file for complete search history.

(56) References Cited

U.S. PATENT DOCUMENTS

| 5,212,784 | A | * | 5/1993 | Sparks ............................... 714/6 |
| 5,390,186 | A | * | 2/1995 | Murata et al. ................... 711/113 |
| 5,504,882 | A | * | 4/1996 | Chai et al. .......................... 714/5 |
| 5,673,382 | A | * | 9/1997 | Cannon et al. ..................... 714/6 |
| 5,742,792 | A | * | 4/1998 | Yanai et al. .................... 711/162 |
| 5,911,779 | A | * | 6/1999 | Stallmo et al. .................... 714/6 |
| 6,065,018 | A | * | 5/2000 | Beier et al. ..................... 707/202 |
| 6,148,412 | A | * | 11/2000 | Cannon et al. .................... 714/6 |
| 6,266,784 | B1 | * | 7/2001 | Hsiao et al. ...................... 714/6 |
| 6,269,431 | B1 | * | 7/2001 | Dunham ....................... 711/162 |
| 6,370,539 | B1 | | 4/2002 | Ashby et al. |
| 6,434,681 | B1 | * | 8/2002 | Armangau ..................... 711/162 |
| 6,490,598 | B1 | * | 12/2002 | Taylor ............................ 707/204 |
| 6,493,804 | B1 | | 12/2002 | Soltis et al. |
| 6,704,836 | B1 | | 3/2004 | Griswold, Jr. et al. |
| 6,738,974 | B1 | | 5/2004 | Nageswaran et al. |
| 6,795,895 | B2 | * | 9/2004 | Merkey et al. ................ 711/114 |
| 2002/0042809 | A1 | | 4/2002 | Sachedina et al. |
| 2002/0178336 | A1 | * | 11/2002 | Fujimoto et al. .............. 711/165 |
| 2002/0199058 | A1 | * | 12/2002 | Ofek .............................. 711/112 |
| 2003/0229764 | A1 | * | 12/2003 | Ohno et al. .................... 711/147 |
| 2004/0078534 | A1 | | 4/2004 | Scheid |

FOREIGN PATENT DOCUMENTS

| EP | 0 809 184 B1 | 7/2002 |
| KR | 19970076238 | 12/1997 |
| KR | 20040047207 | 6/2004 |

OTHER PUBLICATIONS

INT Media Group, RAID, 2002, http://web.archive.org/web/20020810160046/http://www.webopedia.com/TERM/R/RAID.html.* Jupitermedia Corporation, disk mirroring, 2002, http://web.archive.org/web/20021216012639/www.webopedia.com/TERM/D/disk_mirroring.html.*

(Continued)

*Primary Examiner* — Edward Dudek, Jr.
*Assistant Examiner* — Christopher Birkhimer
(74) *Attorney, Agent, or Firm* — Rabindranath Dutta; Konrad Raynes and Victor LLP

(57) ABSTRACT

Provided are a method, system, and an article of manufacture, wherein resources corresponding to at least one copy pool are acquired, and wherein the at least one copy pool has been defined for a first primary storage pool of a storage hierarchy. The acquired resources are retained, in response to determining that data cannot be written to the first primary storage pool. The data is written to the at least one copy pool, in response to writing the data to a second primary storage pool of the storage hierarchy.

27 Claims, 7 Drawing Sheets

OTHER PUBLICATIONS

PCT International Search Report and Written Opinion mailed Oct. 9, 2006 for Application No. PCT/EP2005/056038 filed Nov. 17, 2005.
Non-US Search Report from Korea IP Law regarding Information Disclosure Statement dated Jun. 12, 2009, 1pp.
Patent Abstract for KR 20040047207, published on Jun. 5, 2004, 1 pg.
U.S Patent No. 6,148,412 issued Nov. 14, 2000, counterpart to KR PUPA 1997-0076238.
First Office Action dated May 8, 2009, pp. 1-26, for U.S. Appl. No. 11/932,575, filed Oct. 31, 2007, by inventors Howard Newton Martin, et al.
Response to First Office Action dated Jul. 31, 2007, pp. 1-13, for U.S. Appl. No. 11/932,575, filed Oct. 31, 2007, by inventors Howard Newton Martin , et al.
Final Office Action dated Nov. 24, 2009, pp. 1-31, for U.S. Appl. No. 11/932,575, filed Oct. 31, 2007, by inventors Howard Newton Martin , et al.
Response to Final Office Action, dated Feb. 24, 2010, pp. 1-12, for U.S. Appl. No. 11/932,575, filed Oct. 31, 2007, by inventors Howard Newton Martin , et al.
Notice of Allowance dated Apr. 21, 2010, pp. 1-6, for U.S. Appl. No. 11/932,575, filed Oct. 31, 2007, by inventors Howard Newton Martin, et al.

* cited by examiner

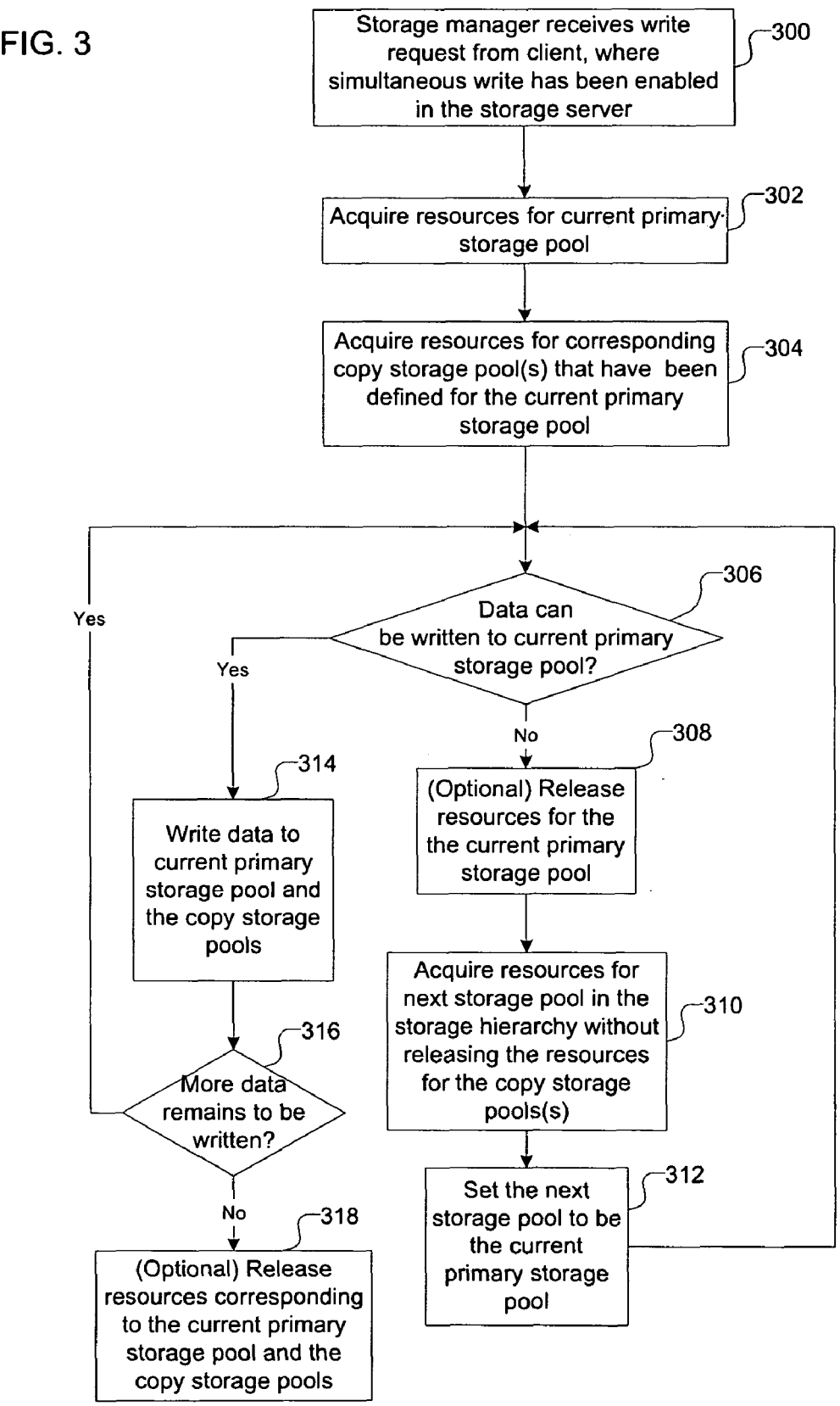

RESOURCE MANAGEMENT FOR DATA STORAGE SERVICES

BACKGROUND

1. Field

The disclosure relates to a method, system, and article of manufacture for resource management for data storage services.

2. Background

A storage manager, such as, the Tivoli* Storage Manager* (TSM) product marketed by International Business Machines (IBM*) Corporation, may be used for securely storing and backing up data. The storage manager may execute in a storage management server, such as, a TSM server, and assure data integrity and provide the ability to protect business critical data in the event of hardware, software and environmental failures. The storage manager may maintain an image of the data and programs on tape cartridges or other storage medium. In the event of a system failure or other events that result in a loss of data, the storage manager may be used to restore the data and programs from the tape cartridges or other storage medium.

*IBM, Tivoli, and Tivoli Storage Manager are trademarks or registered trademarks of IBM Corporation.

The TSM may provide data storage services to clients for backup, archive, or space management of data. The TSM server may store files sent to the TSM server by one or more TSM clients. The data from the TSM clients may be stored on storage media, such as, disks, tape volumes, etc., within a storage hierarchy defined by a system administrator.

Storage media within the storage hierarchy may be grouped to form storage pools. Data being stored from a client to a server is directed to a primary storage pool based within the storage hierarchy. Once the data has been stored in the storage hierarchy, a copy can be made for the purposes of creating a backup of the data. The backup data is created in a copy storage pool. It is possible to create more than one copy of the backup data in different copy storage pools. The system administrator may either manually or through a scheduled event begin backing up the data to a tape copy storage pool. This copy of the data is used for restoring data in the event of a data loss within the storage hierarchy. The administrator may also create a second copy in yet another copy storage pool and transport the tape that includes the second copy of the data to a remote site for storing safely.

The amount of time it takes to backup data to a copy storage pool may be significant and certain clients may not be able to perform a complete backup at the time of writing data. Backups may occur at a later time, such as, during the night, within a certain period of time referred to as the backup window. To reduce the backup window and allow clients to complete backups, TSM provides a feature called simultaneous write.

In simultaneous write, the system administrator defines one or more copy storage pools corresponding to a primary storage pool. This allows for data entering the storage hierarchy to be concurrently written to a primary storage pool and one or more associated copy storage pools. Resources such as disk space, tape drives, tapes, etc., are allocated at the beginning of the storage operation and may remain allocated during the entire storage operation.

SUMMARY OF THE DESCRIBED EMBODIMENTS

Provided are a method, system, and an article of manufacture, wherein resources corresponding to at least one copy pool are acquired, and wherein the at least one copy pool has been defined for a first primary storage pool of a storage hierarchy. The acquired resources are retained, in response to determining that data cannot be written to the first primary storage pool. The data is written to the at least one copy pool, in response to writing the data to a second primary storage pool of the storage hierarchy.

In certain embodiments, the at least one copy pool is a first copy pool, and wherein a second copy pool has been defined for the second primary storage pool. A release is avoided of the resources corresponding to the first copy pool, in response to the writing of the data to the first copy pool, wherein no resources are acquired for the second copy pool.

In further embodiments, the acquired resources are a first set of resources. A request is received to write the data to the first primary storage pool, prior to the acquiring of the first set of resources corresponding to the at least one copy pool. A second set of resources is acquired corresponding to the first primary storage pool. The second set of resources is released and a third set of resources corresponding to the second primary storage pool is acquired, in response to determining that the data cannot be written to the first primary storage pool. The data to is written to the second primary storage pool in association with the writing of the data to the at least one copy pool. The first set of resources and the third set of resources are released.

In yet further embodiments, the first primary storage pool is a disk pool, and the second primary storage pool is a tape pool.

In additional embodiments, the second primary storage pool is lower in the storage hierarchy in comparison to the first primary storage pool, wherein the data is preferred to be written to a highest available primary storage pool in the storage hierarchy.

In yet additional embodiments, the resources are a first set of resources. A second set of resources corresponding to the first primary storage pool is acquired. A determination is made as to whether the data can be written to the first primary storage pool. The data is written to the first primary storage pool, in response to determining that the data can be written to the first primary storage pool. The data is written to the at least one copy pool, in response to the writing of the data to the first primary storage pool. The first set of resources and the second set of resources are released.

In further embodiments, the acquiring, the retaining, and the writing of the data to the at least one copy pool are performed by a storage manager in a storage server in communication with a client that sends the data to the storage server. In certain further embodiments, simultaneous write has been enabled in the storage server.

In still further embodiments, the resources corresponding to the at least one copy pool are acquired by locking hardware resources used to access the at least one copy pool, wherein the hardware resources used to access the at least one copy pool are retained at least until the data has been written to the at least one copy pool.

In further embodiments, the data is written substantially simultaneously to the at least one copy pool and the second primary storage pool.

BRIEF DESCRIPTION OF THE DRAWINGS

Referring now to the drawings in which like reference numbers represent corresponding parts throughout:

FIG. 3 illustrates operations for resource management in accordance with certain embodiments that implement "simultaneous write" operations to copy storage pools;

DETAILED DESCRIPTION

In the following description, reference is made to the accompanying drawings which form a part hereof and which illustrate several embodiments. It is understood that other embodiments may be utilized and structural and operational changes may be made.

In certain implementations of simultaneous write, if for any reason a current primary storage pool cannot contain the data being stored, the storage manager may attempt to store the data to a next storage pool in the storage hierarchy. The next storage pool may be a tape storage pool. Before beginning to store data to the next storage pool, any resources currently allocated to the primary and copy storage pools may be released before acquiring resources for the next storage pool, in order to prevent a deadlock for resources. If the next storage pool also has copy storage pools defined for the purposes of simultaneous write, the associated resources would need to be acquired before the backup of the data to the copy storage pools can be initiated. The release and reacquisition of resources may impact system performance and may sometimes require client sessions to wait for a significant period of time for resources. Furthermore, it is possible that the resource just released may be claimed by another process and may not be available when the original process attempts to reacquire the released resources.

In certain embodiments, releases of acquired resources corresponding to copy storage pools are avoided while creating backup copies of data stored in the primary storage pools of the storage hierarchy.

Figure 1:
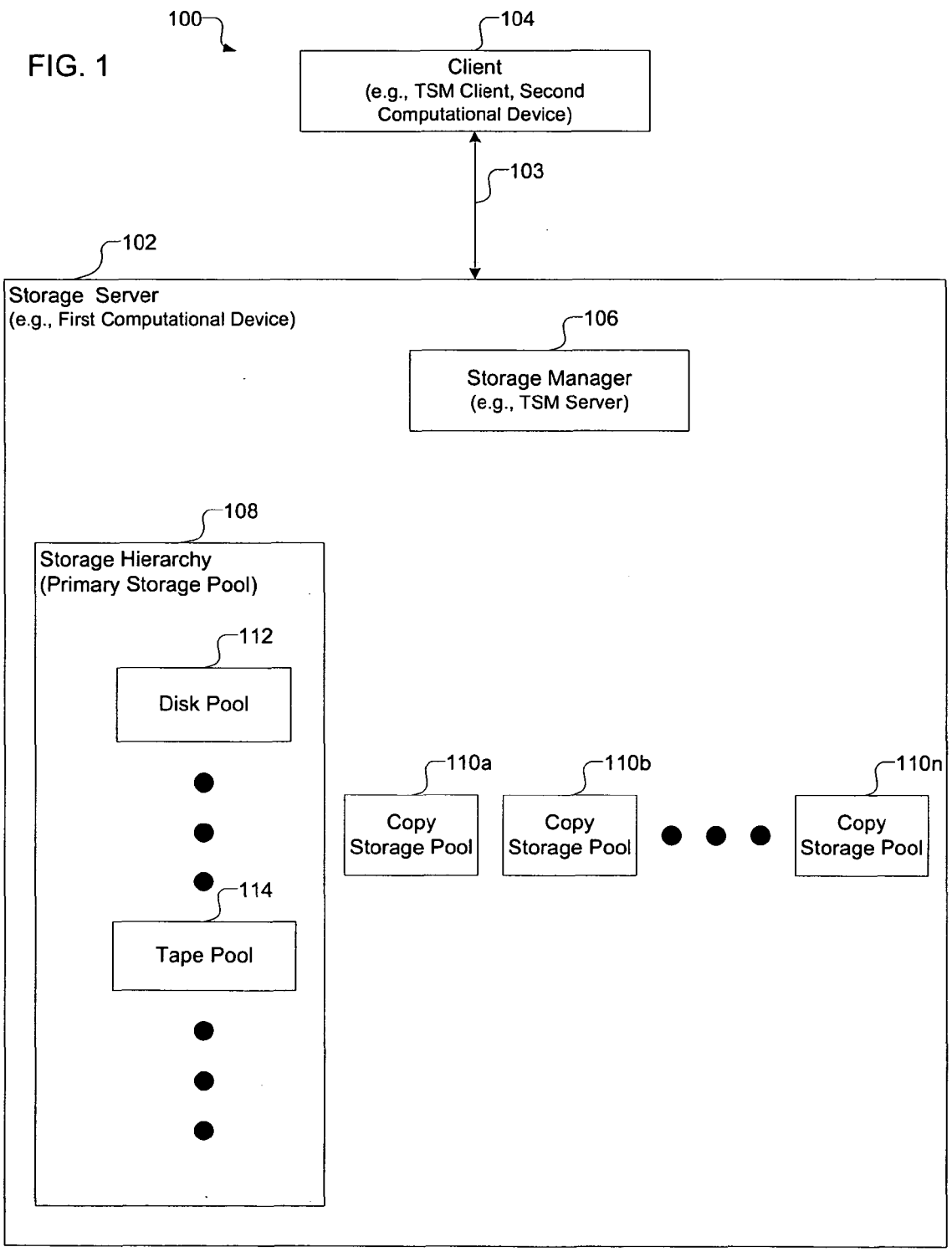
FIG. 1 illustrates a block diagram of a computing environment in accordance with certain embodiments.

FIG. 1 illustrates a block diagram of a computing environment 100 in accordance with certain embodiments. The computing environment 100 includes a first computational device, such as, a storage server 102 that is coupled via a communication link 103 to a second computational device, such as, a client 104.

In certain embodiments, the storage server 102 and the client 104 may comprise any suitable computational device, including those presently known in the art, such as, a personal computer, a workstation, a mainframe, a midrange computer, a network appliance, a palm top computer, a telephony device, a blade computer, a hand held computer, etc. In certain exemplary embodiments the client 104 may comprise a TSM client.

The storage server 102 and the client 104 may communicate directly or via any suitable network, including those presently known in the art, such as, a storage area network (SAN), a local area network (LAN), an Intranet, the Internet, etc. While FIG. 1 shows only one client 104 coupled to the storage server 102, in alternative embodiments a plurality of clients may be coupled to the storage server 102.

The storage server 102 includes an application, such as, a storage manager 106, a storage hierarchy 108 of potential primary storage pools, and a plurality of copy storage pools 110a, 110b, . . . 110n. In certain embodiments, the storage manager 106 may comprise an application, such as, a TSM server.

Exemplary primary storage pools in the storage hierarchy 108 may include a disk pool 112 and a tape pool 114. In certain embodiments, the tape pool 114 may be lower in the storage hierarchy 108 in comparison to the disk pool 112, where data from the client 104 is preferred to be written to a highest available primary storage pool in the storage hierarchy. In certain embodiments, the disk pool 112 may comprise direct access storage, such as hard disks, and the tape pool 114 may comprise sequential storage, such as, tapes. In certain embodiments, the copy storage pools 110a . . . 110n may comprise sequential storage, such as, tapes. Copy storage pools may also be referred to as copy pools.

In certain embodiments, the client 104 sends data to the storage server 102, where the data is to be written to a primary storage pool in the storage hierarchy 108. Associated with a primary storage pool in the storage hierarchy 108 there may be one or more defined copy storage pools selected from the plurality of copy storage pools 110a . . . 110n. If simultaneous write is enabled in the storage server 102, then when data is written to the primary storage pool, the written data may be written simultaneously to the corresponding defined copy storage pools. In certain embodiments, when data is written to the primary storage pool, the written data may be copied to the corresponding defined copy storage pools. The copy storage pools corresponding to a primary storage pool may be defined by an administrator, the storage manager 106, or by an application that runs on the client 104.

Therefore, FIG. 1 illustrates an embodiment in which the storage manager 106 copies or writes simultaneously data that is written to a primary storage pool in the storage hierarchy 108 to one or more copy storage pools selected from the plurality of copy storage pools 110a . . . 110n. Data stored in the copy storage pools 110a . . . 110n may be used to provide redundancy, may be used for recovery from a failure of the primary storage pools, or may be used to recover from loss of data stored in the primary storage pools.

Figure 2:
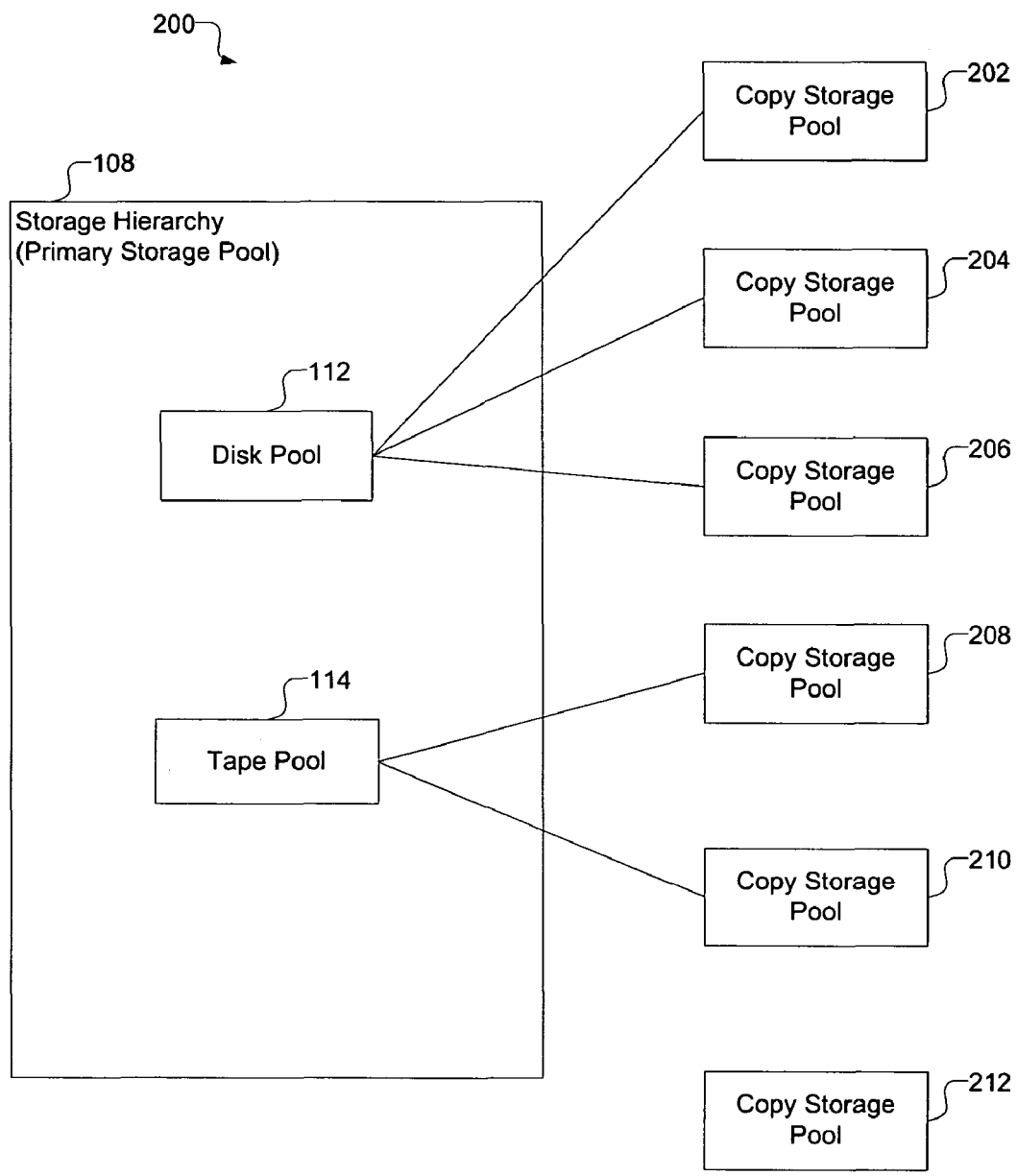
FIG. 2 illustrates a block diagram that shows how exemplary copy storage pools may be defined with respect to exemplary primary storage pools of the storage hierarchy, in accordance with certain embodiments.

FIG. 2 illustrates a block diagram corresponding to a computing environment 200 that shows how exemplary copy storage pools 202, 204, 206, 208, 210, 212 may be defined with respect to exemplary primary storage pools 112, 114 of the storage hierarchy 108, in accordance with certain embodiments.

In FIG. 2, the copy storage pools 202, 204, 206 are defined with respect to the disk pool 112, and the copy storage pools 208, 210 are defined with respect to the tape pool 114. In certain embodiments, before data is written to any pool, the resources associated with the pool should be acquired. For example, before writing to the copy storage pool 202, hardware resources, such as, tape drives, tape volumes, and disk space, may have to be locked by the storage manager 106. However, repeated acquisition and release of resources may impact the performance of computing environment 200.

If data is written to the disk pool 112, then the data may be copied or written simultaneously to the copy storage pools 202, 204, 206. However, if data cannot be written to the disk pool 112, then the data may be written to the next pool in the exemplary storage hierarchy 108, where the next pool in certain embodiments may be the tape pool 114. If data is written to the tape pool 114 and the data is to be copied or written simultaneously to the copy storage pools 208, 210, then in certain situations the resources corresponding to the copy storage pools 202, 204, 206 may have to be released before the acquisition of the resources corresponding to the copy storage pools 208, 210.

Certain embodiments do not release the resources corresponding to the copy storage pools 202, 204, and 206 and use the copy storage pools 202, 204, 206 instead of the copy storage pools 208, 210 for copying data written to the tape pool 114. By not releasing the resources certain embodiments may improve the performance of the computing environment 200, because repeated release and acquisition of resources may degrade the performance of the computing environment 200. FIG. 2 illustrates certain embodiments in which certain releases of acquired resources corresponding to copy storage pools are avoided while creating backup copies of data stored in the primary storage pools of the storage hierarchy 108.

FIG. 3 illustrates operations for resource management in certain embodiments that implement simultaneous write operations to copy storage pools 110a . . . 110n. The operations for resource management may be implemented in the storage manager 106.

Control starts at block 300, where the storage manager 106 receives a write request for writing data to a primary storage pool from the client 104, where simultaneous write has been enabled in the storage server 102. Since simultaneous write has been enabled in the storage server 102, the data written to a primary storage pool should be copied or written simultaneously to one or more corresponding copy storage pools in response to the write request from the client 104. In certain embodiments, storage manager 106 will first attempt to write the data to a current primary storage pool, where the current primary storage pool may initially be assigned to the highest pool in the storage hierarchy 108. For example, in the computing environments 100, 200, the current primary storage pool may initially be the disk pool 112.

The storage manager 106 acquires (at block 302) resources for the current primary storage pool. For example, in certain embodiments the storage manager 106 may acquire the resources corresponding to the disk pool 112. Only after the resources have been acquired can the data be written to the current primary storage pool. After data is written, the resources may be released if the resources are no longer needed for the write request.

The storage manager 106 acquires (at block 304) resources for corresponding copy storage pool(s) that have been defined for the current primary storage pool. For example, in the computing environment 200, the storage manager 106 may acquire the resources corresponding to the copy storage pools 202, 204, 206, where the current primary storage pool is the disk pool 112.

The storage manager 106 determines (at block 306) whether the data can be written to current primary storage pool. For example, in certain embodiments implemented in the computing environment 200, the storage manager 106 determines whether the data can be written to the disk pool 112.

If the storage manager 106 determines (at block 306) that the data cannot be written to the current primary storage pool, then the storage manager 106 in certain embodiments may release (at block 308) the resources for the current primary storage pool. For example, in certain embodiments data may not be written to the disk pool 112 because the file including the data is beyond a certain size or because the disk pool 112 does not have enough storage capacity for accommodating the file. In such a case, the storage manager 106 may release the resources corresponding to the disk pool 112 that were acquired previously in block 302. In certain alternative embodiments, at block 308, the storage manager 106 may not release the resources for the current primary storage pool.

The storage manager 106 acquires (at block 310) resources for a next storage pool in the storage hierarchy 108 without releasing the resources for the copy storage pools, where the resources for the copy storage pools had been previously acquired. For example, in certain embodiments implemented in the computing environment 200, the resources for the copy storage pools 202, 204, 206 are not released, where the next storage pool to the disk pool 112 in the storage hierarchy 108 is the tape pool 114. Even when data cannot be written to the disk pool 112, the resources corresponding to the copy storage pools 202, 204, 206 are retained by the storage manager 106. The storage manager 106 sets (at block 312) the next storage pool to be the current primary storage pool. For example, in certain embodiments implemented in the computing environment 200 the current primary storage pool is set to be the tape pool 114 when the data cannot be written to the disk pool 112. Control returns to block 306, where the storage manager 106 determines whether the data can be written to the current primary storage pool.

If the storage manager 106 determines (at block 306) that the data can be written to the current primary storage pool then the storage manager 106 writes (at block 314) the data to the current primary storage pool and the copy storage pools. For example, in certain embodiments implemented in the computing environment 200, the storage manager 106 writes the data to the tape pool 114 and copies the written data to the copy storage pools 202, 204, 206 whose resources have not been released. Therefore, even when data cannot be written to the disk pool 112, the copy storage pools 202, 204, 206 defined for the disk pool 112 are used to store data that may be written to the tape pool 114. In certain embodiments, the copy storage pools 208, 210 that have been defined for the tape pools 114 may not be used for copying the data written to the tape pool 114.

The storage manager 106 determines (at block 316) whether more data remains to be written. If so, control returns to block 306 to determine whether remaining data can be written to the current primary storage pool. If not, the storage manager 106 may release (at block 318) the resources corresponding to the current primary storage pool. The storage manager 106 may also release the resources corresponding to the copy storage pools. For example, in certain embodiments implemented in the computing environment 200, the storage manager 106 may release the resources corresponding to the tape pool 114 and the copy storage pools 202, 204, 206. In certain embodiments, at block 318, the storage manager 106 may not release the resources corresponding to the current primary storage pool and the copy storage pools.

Therefore, FIG. 3 illustrates certain embodiments in which copy storage pools are not released when data cannot be written to a current primary storage pool. Even when a next pool of the storage hierarchy 108 is used to write data, the copy storage pools that have not been released may be used to store backup copies of the data. The copy storage pools used to store the backup copies of the data may or may not be defined with respect to the current primary storage pool. For example, in certain embodiments, the copy storage pools 202, 204, 206 defined with respect to the disk pool 112 may store the data written to the tape pool 114.

Figure 4A:
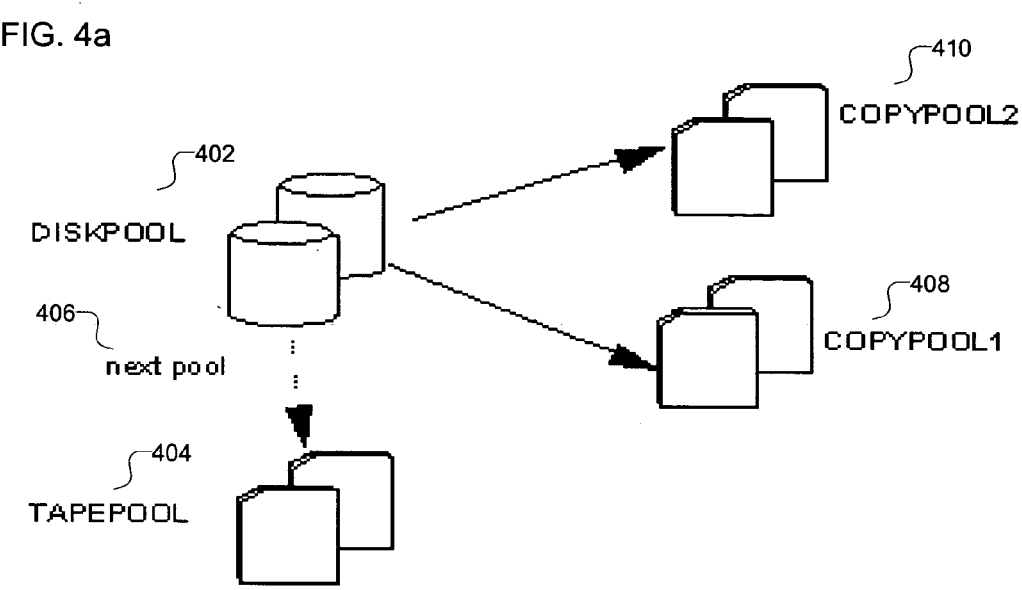
FIGS. 4a, 4b illustrate how exemplary files are stored by the storage manager, in accordance with first exemplary embodiments.
Figure 4B:
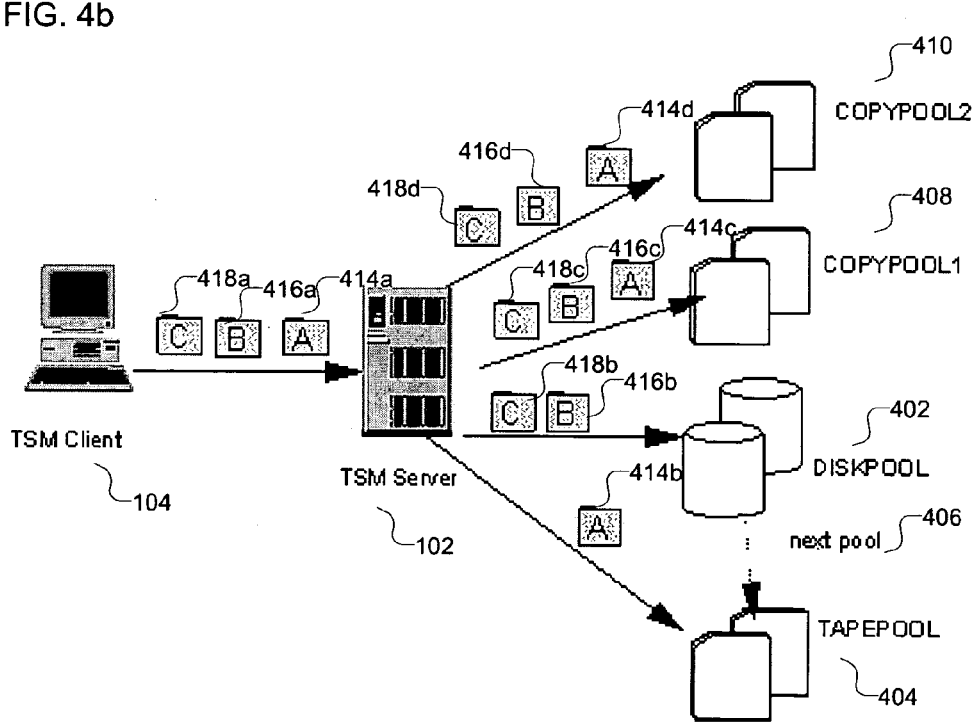

FIGS. 4a, 4b illustrate how exemplary files are stored by the storage manager 106, in accordance with first exemplary embodiments.

In FIGS. 4a, 4b the primary storage pools, DISKPOOL 402 and TAPEPOOL 404 form the storage hierarchy 108, where the DISKPOOL 402 is at the highest level of the storage hierarchy 108, and the TAPEPOOL 404 is the next pool (represented by reference numeral 406) of the storage hierarchy 108, i.e., the TAPEPOOL 404 is the next in the level of storage hierarchy after the DISKPOOL 402. In certain embodiments, the DISKPOOL 402 may correspond to the disk pool 112 and the TAPEPOOL 404 may correspond to the tape pool 114.

In FIGS. 4a, 4b COPYPOOL1 (reference numeral 408) and COPYPOOL2 (reference numeral 410) are defined with respect to the DISKPOOL 402. In certain embodiments, COPYPOOL1 (reference numeral 408) and COPYPOOL2 (reference numeral 410) are selected from the plurality of copy storage pools 110a . . . 110n.

The TSM client 104 sends file A (reference numeral 414a), file B (reference numeral 416a), and file C (reference numeral 418a) to the TSM server 102 for writing to the DISKPOOL 402. The DISKPOOL 402 has only sufficient space to store file B (reference numeral 416b) and file C (reference numeral 418b) and the next pool 406, i.e., the TAPEPOOL 404, has enough space for file A (reference numeral 414b).

In certain embodiments, where simultaneous write is enabled, when files A, B, C (reference numerals 414a, 416a, 418a) are backed up, files B, C (reference numerals 418b, 416b, 418c, 416c, 418d, 416d) are simultaneously written to DISKPOOL 402, COPYPOOL1 (reference numeral 408), AND COPYPOOL2 (reference numeral 410). File A (reference numeral 414b, 414c, 414d) is simultaneously written to TAPEPOOL 404, COPYPOOL1 (reference numeral 408) and COPYPOOL2 (reference numeral 410).

Figure 5A:
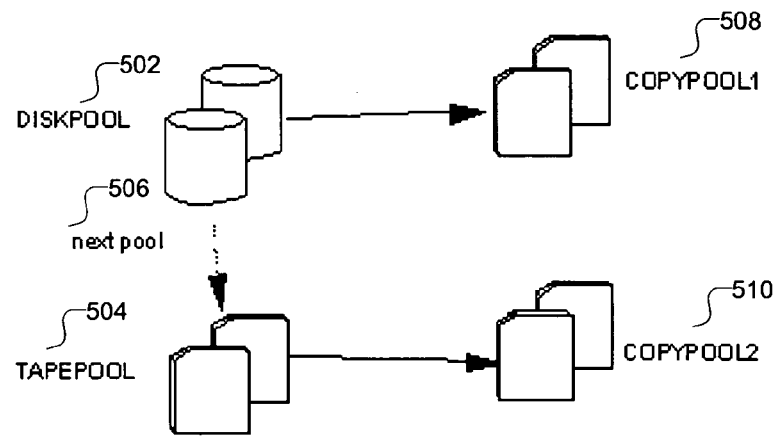
FIGS. 5a, 5b illustrate how exemplary files are stored by the storage manager, in accordance with second exemplary embodiments.
Figure 5B:
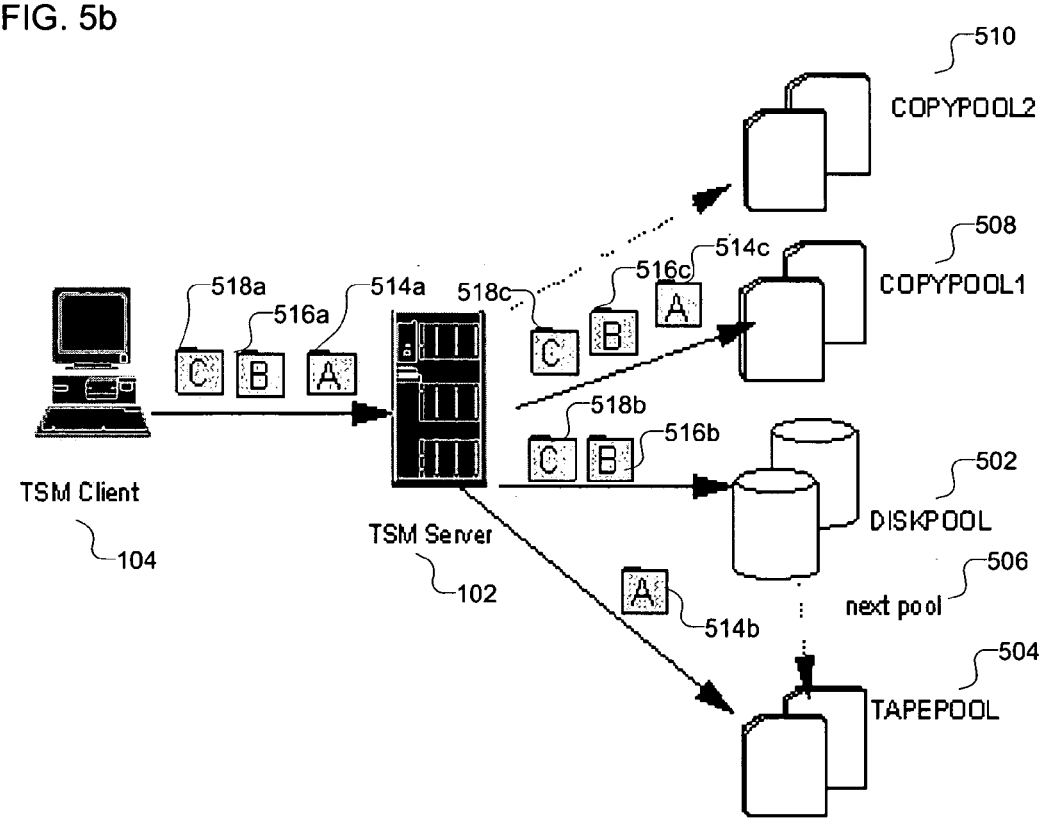

FIGS. 5a, 5b illustrate how exemplary files are stored by the storage manager 106, in accordance with second exemplary embodiments.

In FIGS. 5a, 5b the primary storage pools, DISKPOOL 502 and TAPEPOOL 504 form the storage hierarchy 108, where the DISKPOOL 502 is at the highest level of the storage hierarchy 108, and the TAPEPOOL 504 is the next pool (represented by reference numeral 506) of the storage hierarchy 108, i.e., the TAPEPOOL 504 is the next in the level of storage hierarchy after the DISKPOOL 502. In certain embodiments, the DISKPOOL 502 may correspond to the disk pool 112 and the TAPEPOOL 504 may correspond to the tape pool 114.

In FIGS. 5a, 5b COPYPOOL1 (reference numeral 508) is defined with respect to DISKPOOL 502, and COPYPOOL2 (reference numeral 510) is defined with respect to TAPEPOOL 504. In certain embodiments, COPYPOOL1 (reference numeral 508) and COPYPOOL2 (reference numeral 510) are selected from the plurality of copy storage pools 110a . . . 110n.

The TSM client 104 sends file A (reference numeral 514a), file B (reference numeral 516a), and file C (reference numeral 518a) to the TSM server 102 for writing to the DISKPOOL 502. The DISKPOOL 502 has only sufficient space to store file B (reference numeral 516b) and file C (reference numeral 518b) and the next pool 506, i.e., the TAPEPOOL 504, has enough space for file A (reference numeral 514b).

In certain embodiments, where simultaneous write is enabled, when files A, B, C (reference numerals 514a, 516a, 518a) are backed up, files B, C (reference numerals 518b, 516b, 518c, 516c) are simultaneously written to DISKPOOL 502 and COPYPOOL1 (reference numeral 508). File A (reference numeral 514b, 514c) is simultaneously written to TAPEPOOL 504 and COPYPOOL1 (reference numeral 508). COPYPOOL2 (reference numeral 510) is not for backing up the data.

Figure 6A:
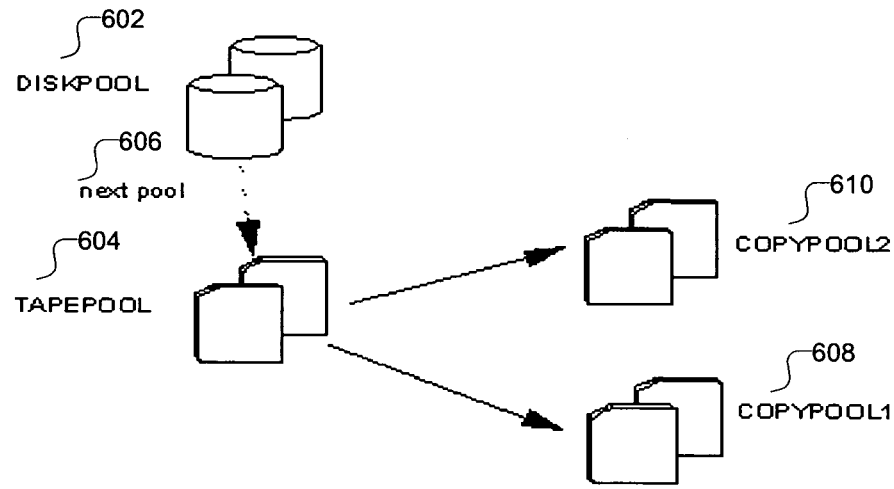
FIGS. 6a, 6b illustrate how exemplary files are stored by the storage manager, in accordance with third embodiments.
Figure 6B:
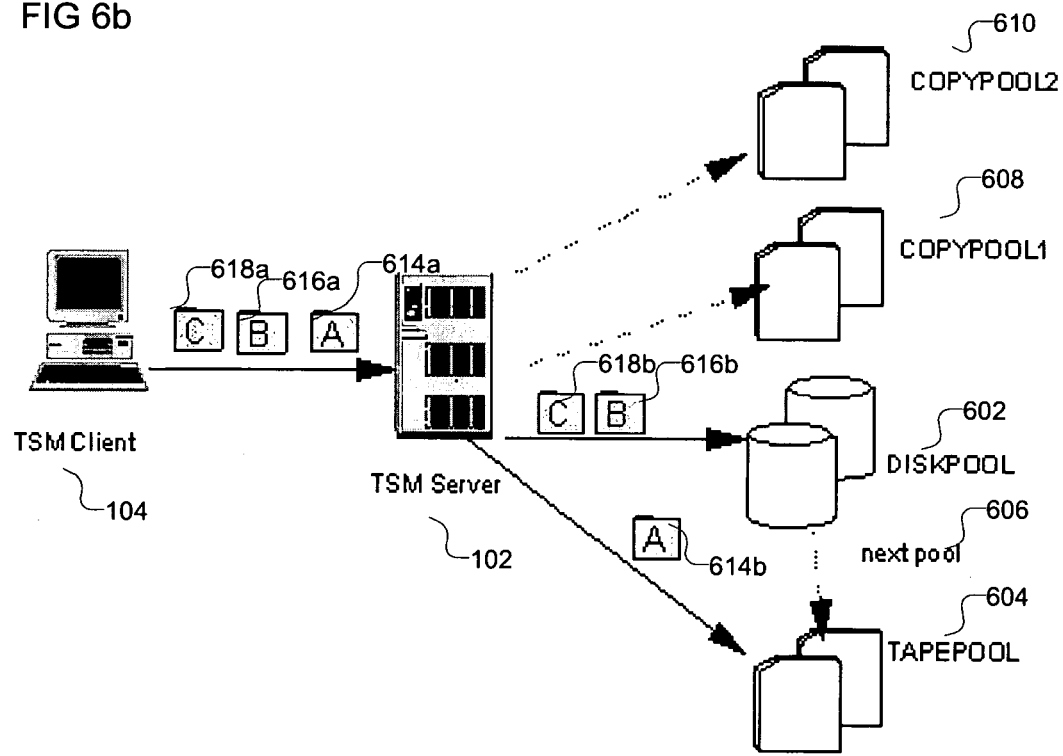

FIGS. 6a, 6b illustrate how exemplary files are stored by the storage manager 106, in accordance with third embodiments, where simultaneous write is not enabled for backups.

In FIGS. 6a, 6b the primary storage pools, DISKPOOL 602 and TAPEPOOL 604 form the storage hierarchy 108, where the DISKPOOL 602 is at the highest level of the storage hierarchy 108, and the TAPEPOOL 604 is the next pool (represented by reference numeral 606) of the storage hierarchy 108, i.e., the TAPEPOOL 604 is the next in the level of storage hierarchy after the DISKPOOL 602. In certain embodiments, the DISKPOOL 602 may correspond to the disk pool 112 and the TAPEPOOL 604 may correspond to the tape pool 114.

In FIGS. 6a, 6b COPYPOOL1 (reference numeral 608) and COPYPOOL2 (reference numeral 610) are defined with respect to TAPEPOOL 604. In certain embodiments, COPYPOOL1 (reference numeral 608) and COPYPOOL2 (reference numeral 610) are selected from the plurality of copy storage pools 110a . . . 110n.

The TSM client 104 sends file A (reference numeral 614a), file B (reference numeral 616a), and file C (reference numeral 618a) to the TSM server 102 for writing to the DISKPOOL 602. The DISKPOOL 602 has only sufficient space to store file B (reference numeral 616b) and file C (reference numeral 618b) and the next pool 606, i.e., the TAPEPOOL 604, has enough space for file A (reference numeral 614b).

In certain embodiments, where simultaneous write is not enabled, when files A, B, C (reference numerals 614a, 616a, 618a) are written, files B, C (reference numerals 618b, 616b) are written to DISKPOOL 602. File A (reference numeral 614b) is written to TAPEPOOL 604. Since simultaneous write is not enabled no files are written to COPYPOOL1 (reference numeral 608) and COPYPOOL2 (reference numeral 610), even though copy pools have been defined for the TAPEPOOL 604.

Certain embodiments provide an inheritance model for simultaneous write operations. The inheritance model reduces the effect of releasing and reacquiring of resources associated with copy storage pools on store operations. If it becomes necessary to store data to the next primary storage pool, only the primary storage pool resources may be released and the resources for the next primary storage pool are acquired. The next primary pool inherits the copy pool list of the original primary storage pool and uses the resources already acquired for the copy storage pools. Certain embodiments attempt to honor the original intent of the primary pool's copy pool list, even if data has to be stored in the next storage pool. By not releasing the copy pool resources, certain embodiments may reduce the time spent in acquiring tape drives and tape volumes.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 7:
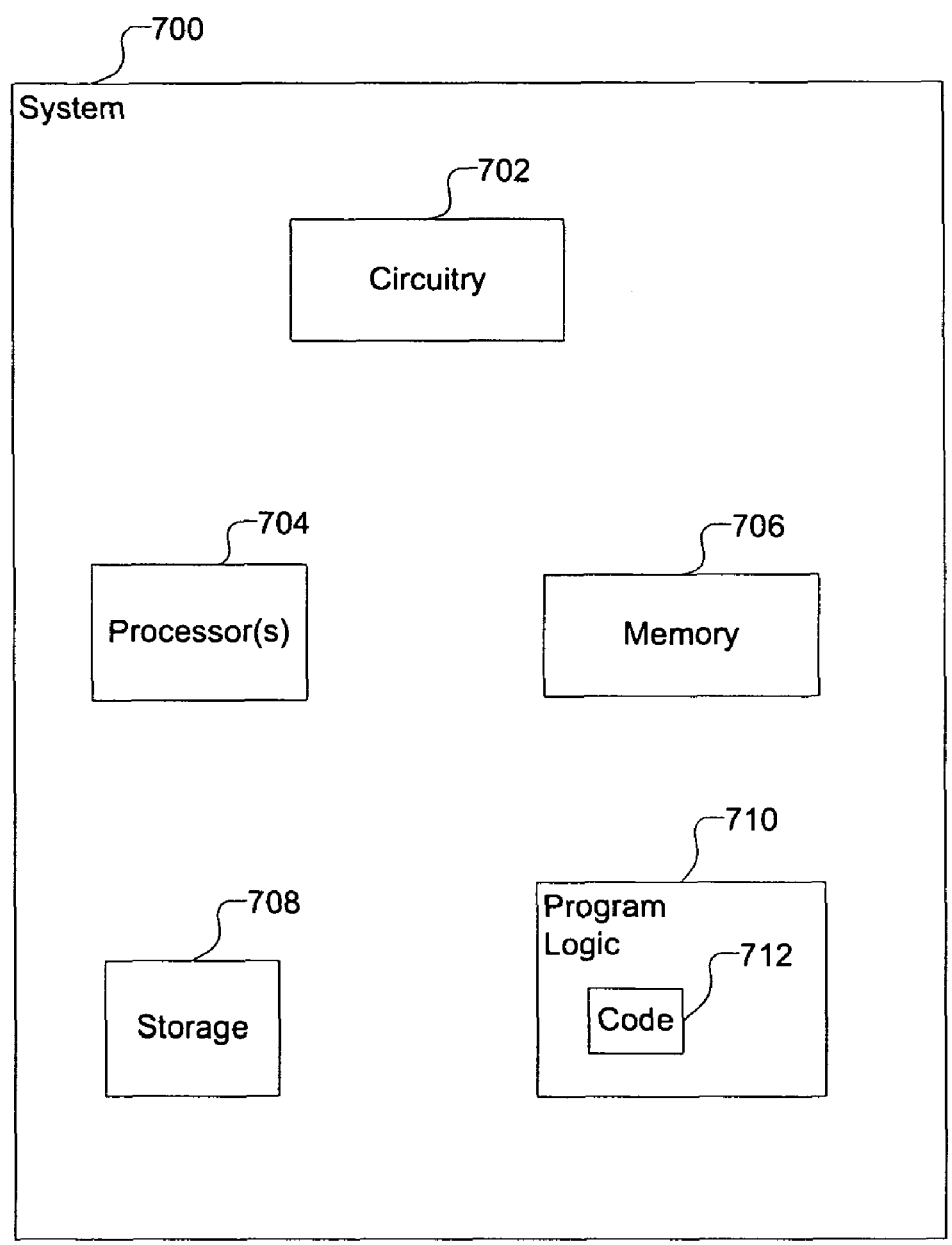
FIG. 7 illustrates a system in which certain embodiments are implemented.

FIG. 7 illustrates a block diagram of a system 700 in which certain embodiments may be implemented. In certain embodiments, the storage server 102 may be implemented in accordance with the system 700. The system 700 may include a circuitry 702 that may in certain embodiments include a processor 704. The system 700 may also include a memory 706 (e.g., a volatile memory device), and storage 708. Certain elements of the system 700 may or may not be found in the storage server 102. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 3 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a request to write data to a disk pool of a storage hierarchy, wherein the storage hierarchy includes a tape pool in addition to the disk pool, wherein a first copy pool has been defined for the disk pool, wherein acquisition of hardware resources is required for writing to any defined copy pool, and wherein the hardware resources include at least one of a tape drive, a tape volume, and disk space;
   acquiring a first set of hardware resources corresponding to the first copy pool that has been defined for the disk pool, by locking the first set of hardware resources used for writing to the first copy pool;
   determining that the data cannot be written to the disk pool of the storage hierarchy;
   retaining the acquired first set of hardware resources, in response to determining that data cannot be written to the disk pool;
   writing the data to the tape pool of the storage hierarchy; and
   writing the data to the first copy pool, in response to writing the data to the tape pool of the storage hierarchy, wherein a release of the acquired first set of hardware resources corresponding to the first copy pool is avoided in response to the writing of the data to the first copy pool, wherein an inheritance model for simultaneous write operations is provided in which a copy pool list of the disk pool is inherited by the tape pool, and wherein use of the inheritance model reduces effects caused by release and reacquisition of any hardware resources associated with copy pools.

2. The method of claim 1, the method further comprising:
   acquiring a second set of hardware resources corresponding to the disk pool;
   releasing the second set of hardware resources and acquiring a third set of hardware resources corresponding to the tape pool, in response to determining that the data cannot be written to the disk pool;
   writing the data to the tape pool in association with the writing of the data to the first copy pool; and
   releasing the first set of hardware resources, and the third set of hardware resources.

3. The method of claim 1, wherein the tape pool is lower in the storage hierarchy in comparison to the disk pool, and wherein the data is preferred to be written to a highest available primary storage pool in the storage hierarchy.

4. The method of claim 1, the method further comprising:
   acquiring a second set of hardware resources corresponding to the disk pool;
   determining whether the data can be written to the disk pool;
   writing the data to the disk pool, in response to determining that the data can be written to the disk pool;
   writing the data to the first copy pool, in response to the writing of the data to the disk pool; and
   releasing the first set of hardware resources and the second set of hardware resources.

5. The method of claim 1, wherein the acquiring, the retaining, and the writing of the data to the first copy pool are performed by a storage manager in a storage server in communication with a client that sends the data to the storage server.

6. The method of claim 5, wherein simultaneous write has been enabled in the storage server.

7. The method of claim 1, wherein the first set of hardware resources used to access the first copy pool are retained at least until the data has been written to the first copy pool.

8. The method of claim 1, wherein the data is written to the first copy pool and the tape pool substantially simultaneously.

9. A system, comprising:
memory; and
a processor coupled to the memory, wherein the processor is capable of performing operations, the operations comprising:
(i) receiving a request to write data to a disk pool of a storage hierarchy, wherein the storage hierarchy includes a tape pool in addition to the disk pool, wherein a first copy pool has been defined for the disk pool, wherein acquisition of hardware resources is required for writing to any defined copy pool, and wherein the hardware resources include at least one of a tape drive, a tape volume, and disk space;
(ii) acquiring a first set of hardware resources corresponding to the first copy pool that has been defined for the disk pool, by locking the first set of hardware resources used for writing to the first copy pool;
(iii) determining that the data cannot be written to the disk pool of the storage hierarchy;
(iv) retaining the acquired first set of hardware resources, in response to determining that data cannot be written to the disk pool;
(v) writing the data to the tape pool of the storage hierarchy; and
(vi) writing the data to the first copy pool, in response to writing the data to the tape pool of the storage hierarchy, wherein a release of the acquired first set of hardware resources corresponding to the first copy pool is avoided in response to the writing of the data to the first copy pool, wherein an inheritance model for simultaneous write operations is provided in which a copy pool list of the disk pool is inherited by the tape pool, and wherein use of the inheritance model reduces effects caused by release and reacquisition of any hardware resources associated with copy pools.

10. The system of claim 9, wherein the operations further comprise:
acquiring a second set of hardware resources corresponding to the disk pool;
releasing the second set of hardware resources and acquiring a third set of hardware resources corresponding to the tape pool, in response to determining that the data cannot be written to the disk pool;
writing the data to the tape pool in association with the writing of the data to the first copy pool; and
releasing the first set of hardware resources, and the third set of hardware resources.

11. The system of claim 9, wherein the tape pool is lower in the storage hierarchy in comparison to the disk pool, and wherein the data is preferred to be written to a highest available primary storage pool in the storage hierarchy.

12. The system of claim 9,
acquiring a second set of hardware resources corresponding to the disk pool;
determining whether the data can be written to the disk pool;
writing the data to the disk pool, in response to determining that the data can be written to the disk pool;
writing the data to the first copy pool, in response to the writing of the data to the disk pool; and
releasing the first set of hardware resources and the second set of hardware resources.

13. The system of claim 9, wherein the acquiring, the retaining, and the writing of the data to the first copy pool are performed by a storage manager in a storage server in communication with a client that sends the data to the storage server.

14. The system of claim 13, wherein simultaneous write has been enabled in the storage server.

15. The system of claim 9, wherein the hardware resources used to access the first copy pool are retained at least until the data has been written to the first copy pool.

16. The system of claim 9, wherein the data is written to the first copy pool and the tape pool substantially simultaneously.

17. A computer readable storage medium including code, wherein the code when executed is capable of causing operations, the operations comprising:
receiving a request to write data to a disk pool of a storage hierarchy, wherein the storage hierarchy includes a tape pool in addition to the disk pool, wherein a first copy pool has been defined for the disk pool, wherein acquisition of hardware resources is required for writing to any defined copy pool, and wherein the hardware resources include at least one of a tape drive, a tape volume, and disk space;
acquiring a first set of hardware resources corresponding to the first copy pool that has been defined for the disk pool, by locking the first set of hardware resources used for writing to the first copy pool;
determining that the data cannot be written to the disk pool of the storage hierarchy;
retaining the acquired first set of hardware resources, in response to determining that data cannot be written to the disk pool;
writing the data to the tape pool of the storage hierarchy; and
writing the data to the first copy pool, in response to writing the data to the tape pool of the storage hierarchy, wherein a release of the acquired first set of hardware resources corresponding to the first copy pool is avoided in response to the writing of the data to the first copy pool, wherein an inheritance model for simultaneous write operations is provided in which a copy pool list of the disk pool is inherited by the tape pool, and wherein use of the inheritance model reduces effects caused by release and reacquisition of any hardware resources associated with copy pools.

18. The computer readable storage medium of claim 17, the operations further comprising:
acquiring a second set of hardware resources corresponding to the disk pool;
releasing the second set of hardware resources and acquiring a third set of hardware resources corresponding to the tape pool, in response to determining that the data cannot be written to the disk pool;
writing the data to the tape pool in association with the writing of the data to the first copy pool; and
releasing the first set of hardware resources, and the third set of hardware resources.

19. The computer readable storage medium of claim 17, wherein the tape pool is lower in the storage hierarchy in comparison to the disk pool, and wherein the data is preferred to be written to a highest available primary storage pool in the storage hierarchy.

20. The computer readable storage medium of claim 17, the operations further comprising:

acquiring a second set of hardware resources corresponding to the disk pool;

determining whether the data can be written to the disk pool;

writing the data to the disk pool, in response to determining that the data can be written to the disk pool;

writing the data to the first copy pool, in response to the writing of the data to the disk pool; and releasing the first set of hardware resources and the second set of hardware resources.

21. The computer readable storage medium of claim 17, wherein the acquiring, the retaining, and the writing of the data to the first copy pool are performed by a storage manager in a storage server in communication with a client that sends the data to the storage server.

22. The computer readable storage medium of claim 21, wherein simultaneous write has been enabled in the storage server.

23. The computer readable storage medium of claim 17, wherein the hardware resources used to access the first copy pool are retained at least until the data has been written to the first copy pool.

24. The computer readable storage medium of claim 17, wherein the data is written to the first copy pool and the tape pool substantially simultaneously.

25. The method of claim 1, wherein acquisition of any hardware resources for any second copy pool corresponding to the tape pool is avoided.

26. The system of claim 9, wherein acquisition of any hardware resources for any second copy pool corresponding to the tape pool is avoided.

27. The computer readable storage medium of claim 17, wherein acquisition of any hardware resources for any second copy pool corresponding to the tape pool is avoided.

* * * * *